COLOR TELEVISION

Filed Oct. 30, 1952 3 Sheets-Sheet 1

INVENTOR.
WILLIAM D. HOUGHTON
BY [signature]
ATTORNEY

Feb. 14, 1956 W. D. HOUGHTON 2,734,939

COLOR TELEVISION

Filed Oct. 30, 1952 3 Sheets-Sheet 2

INVENTOR.
WILLIAM D. HOUGHTON
BY [signature]
ATTORNEY

INVENTOR.
WILLIAM D. HOUGHTON
BY Olin I. Mitchell
ATTORNEY

United States Patent Office 2,734,939

Patented Feb. 14, 1956

2,734,939

COLOR TELEVISION

William D. Houghton, Princeton, N. J., assignor to Radio Corporation of America, a corporation of Delaware Application October 30, 1952, Serial No. 317,668

11 Claims. (Cl. 178—5.4)

The present invention relates to a system for translating color images into electrical signals, such as a color television system.

More particularly, the invention relates to a system for the transmission of color information, wherein a single color carrier wave is employed to convey necessary hue, chroma and brightness components of a color image.

A color television system has been proposed in which the brightness detail may be transmitted substantially in the manner customary for black and white transmission—i. e. by amplitude-modulating a carrier wave—and in which the color information is transmitted by means of a subcarrier which is amplitude- and phase-modulated. The amplitude of this subcarrier is indicative of color saturation or chroma, while its phase with respect to a reference frequency is indicative of hue. This proposed television system is described in an article entitled "Principles of NTSC compatible color television," February 1952, "Electronics," at page 88 et seq.

It is, therefore, a primary object of this invention to provide means for developing a phase- and amplitude-modulated color carrier by means of voltages applied to a carrier, without resorting to the three color pickup devices required under existing proposals.

Another object of the present invention is to provide means for furnishing a voltage which is indicative of hue to be employed in phase-modulating a carrier and another voltage indicative of chromaticity or color saturation for amplitude-modulating the same carrier.

According to one proposed color television arrangement, a single color pickup tube is provided which develops a reference frequency and a phase- and amplitude-modulated carrier wave which also contains brightness information. The present invention has as one of its objects, therefore, that of providing means for deriving from such phase- and amplitude-modulated carrier output a voltage corresponding to the hue of an image "seen" by the pickup tube, another voltage indicative of the saturation of such image and additional means for separating from the composite output of the tube the brightness components to be added to the transmitted carrier.

In general, the present invention contemplates means for comparing the phase of the color tube output with the phase of a synchronizing signal also furnished by the tube to produce a voltage which is a function of hue. The amplitude of the tube's output is detected to produce a signal which is a function of chroma. The brightness components of the composite tube output are separated from the balance of the signal by means of a low pass filter, thus providing a black and white or "brightness" signal. The hue signal, thus derived, is employed to modulate the phase of a carrier wave produced by a master oscillator, while the chroma signal is employed to modulate the amplitude of the phase-modulated carrier wave. The resultant phase- and amplitude-modulated carrier is then combined with the brightness signal and such synchronizing information as "reference frequency bursts" and vertical and horizontal sync signals to produce a composite color signal which is compatible with present-day black and white television systems. In accordance with another facet of the invention, a test signal suitable for employment in checking the response of color television equipment of the type described in the above-identified article is produced by means of equipment including a master oscillator, a phase modulator for shifting the phase of the oscillator output in accordance with a variable voltage, and an amplitude-modulator adapted to be operative in response to a variable voltage comparable to a chroma signal. To this phase- and amplitude-modulated carrier wave are added synchronizing signals and reference frequency bursts.

Other objects and advantages of the invention will become apparent to persons skilled in the art from a study of the following detailed description of the accompanying drawings in which:

Fig. 1 is a graphic illustration of the variation of hue signal voltage amplitude in accordance with color;

Fig. 1*a* is a vector diagram to be described in connection with the graph of Fig. 1;

Fig. 2 is an enlarged fragmentary sectional view of a single color pickup tube which may be employed in the operation of the invention;

Fig. 2*a* illustrates a series of waveforms to which reference will be made in the description of the present invention;

Figure 1:
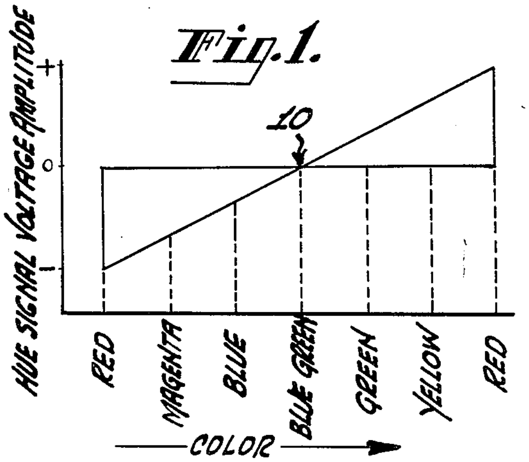
Figure 1A:
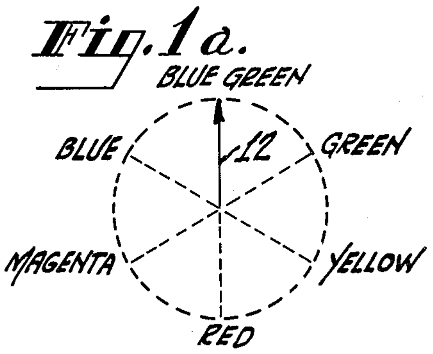

As stated above, the invention contemplates the phase modulation of a carrier wave to indicate hue, and Fig. 1 illustrates the voltage required to phase-shift the color carrier through 360°. Fig. 1*a* illustrates a vector diagram corresponding to the graph of Fig. 1. Thus, as shown, a zero voltage may be assumed to represent a color which is halfway between blue and green, this point being indicated by reference numeral 10, and this could equal a zero phase shift of the color vector 12 of Fig. 1*a*. A positive increase in voltage is represented by a clockwise rotation of the vector of Fig. 1*a* so that, as the hue or color indicated changes from blue-green through green and yellow to red, the vector will have reached a maximum positive position indicative of a maximum positive input to the phase shifting means. Similarly, an increase of the voltage on the graph of Fig. 1 in a negative direction would represent a continual clockwise rotation of the vector of Fig. 1*a* through blue and magenta to red, which is 180° displaced from the zero position or, in other words, at the maximum negative input voltage position. Thus, as persons skilled in the art will appreciate, the phase of a color carrier may be varied so as to be indicative of any desired hue by varying the amplitude of a voltage fed into a phase-shifter between predetermined limits.

Figures 2, 2A:
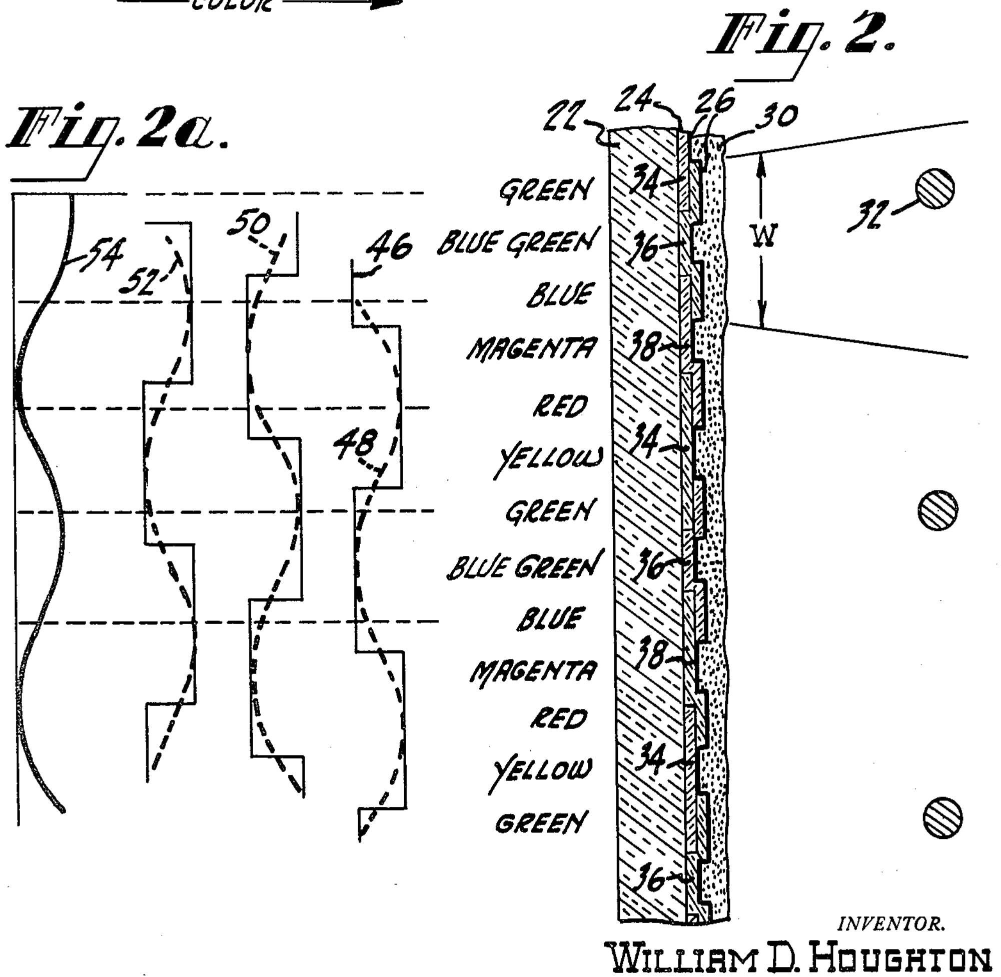
Figure 3:
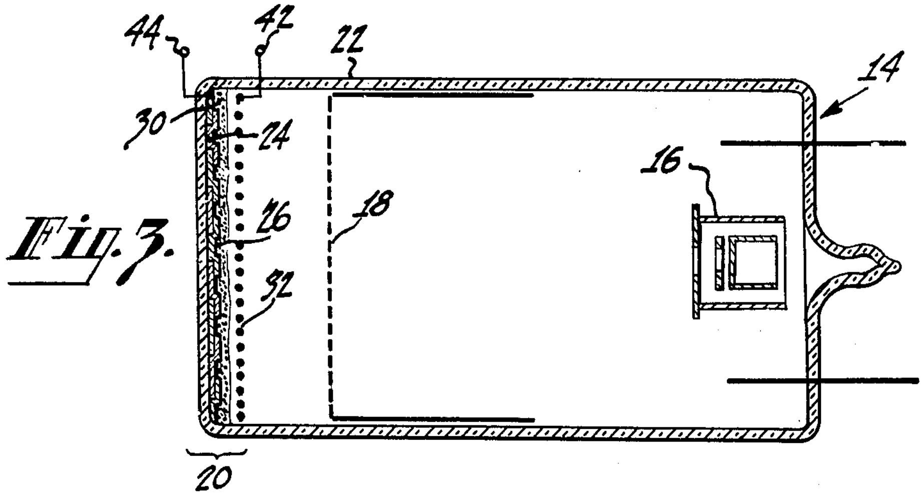
Fig. 3 is a vertical sectional view of the tube which is partially illustrated by Fig. 2.

In Fig. 3, a color television camera tube such as has been described briefly above is shown. This camera tube, indicated generally by reference numeral 14 may be of the "vidicon" type such as is described in an article entitled "The vidicon photoconductive camera tube," appearing at page 70 et seq. of the May 1950 issue of "Electronics." Camera tube 14 includes an electron gun 16, a wall screen 18 and target area 20 and is enclosed within a glass envelope 22. The target area 20 comprises, as shown more clearly in Fig. 2, a color filter arrangement 24, a transparent or semi-transparent conducting signal plate 26, a photoconductive target 30 and a fine wire grille 32. The detailed construction of the target area 20 of camera tube 14 is best seen in Fig. 2 wherein there is shown the front portion of the glass envelope 22, upon which is mounted the filter arrangement 24, which may be of the multi-layer interference type. That is, negative-blue filter elements 34, negative-red filter elements 36 and negative-green filter elements 38 are arranged so that they overlap each other by one-third. The transparent or semi-transparent conducting signal plate 26 is located on the side of the filter arrangement 24 which is remote from the glass envelope 22, while the photoconductive target 30 is placed on the side of the signal plate 26 remote from the filter arrangement 24.

Filter elements 34, 36, and 38 are in the form of elongated strips positioned perpendicular to the direction of scanning of the electron beam 40. The electron beam 40 is illustrated in Fig. 2 as being focused at the photoconductive target 30 where its width "W" is equal to approximately the width of one of the filter elements.

The fine wire grille 32 is positioned a short distance from the photoconductive layer closer to the electron gun 16. The wires comprising the grille are shown placed at intervals equal to the interval between two corresponding similar filter elements, while the width of the electron beam 40 in the plane of the fine wire grille 32 is slightly smaller than the distance between the outside diameter of two consecutive wires. The wires of grille 32 are electrically connected to each other and to an output lead 42 of Fig. 3. An output lead 44 is connected to the conducting signal plate 26.

Waveform 46 of Fig. 2*a* illustrates the response of camera tube 14 when red light is projected upon the target area 20 and wherein an infinitely sharp electron beam scans the target area. With an electron beam 40 of width "W" employed in scanning, the response of the camera tube 14 would be substantially sinusoidal as shown at 48. Similarly, waveforms 50 and 52 illustrate the response of the camera tube 14 for green and blue light, respectively, for an electron beam of width "W."

The curve indicated at 54 in Fig. 2*a* shows the output signal obtained from the fine wire grille which is available at output lead 42. This output signal 54 is at a maximum when the electron beam 40 in impinging upon one of the wires 32 and is at a minimum when the electron beam 40 passes between two of the wires 32 without striking either of them. The output signal from the wire grille may be employed as a reference frequency in a manner to be described more fully hereinafter. It should be noted at this point, however, that waveform 48, representing red light, waveform 50, representing green light and waveform 52, indicating blue light are displaced in phase with respect to each other. The phase of the output signal of camera tube 14 is therefore indicative of the color of the light projected upon it and, if the scanning of the target 20 by electron beam 40 were perfectly linear, the phase of the output signal of the camera tube could be measured directly and color thus determined. Such scanning is seldom perfectly linear, however, and, for that reason, the reference frequency 54 generated by the scanning beam 40 in conjunction with the wire grille 32 may be used as a standard against which the phase displacement of the output signal on terminal 44 may be measured.

Figure 4:
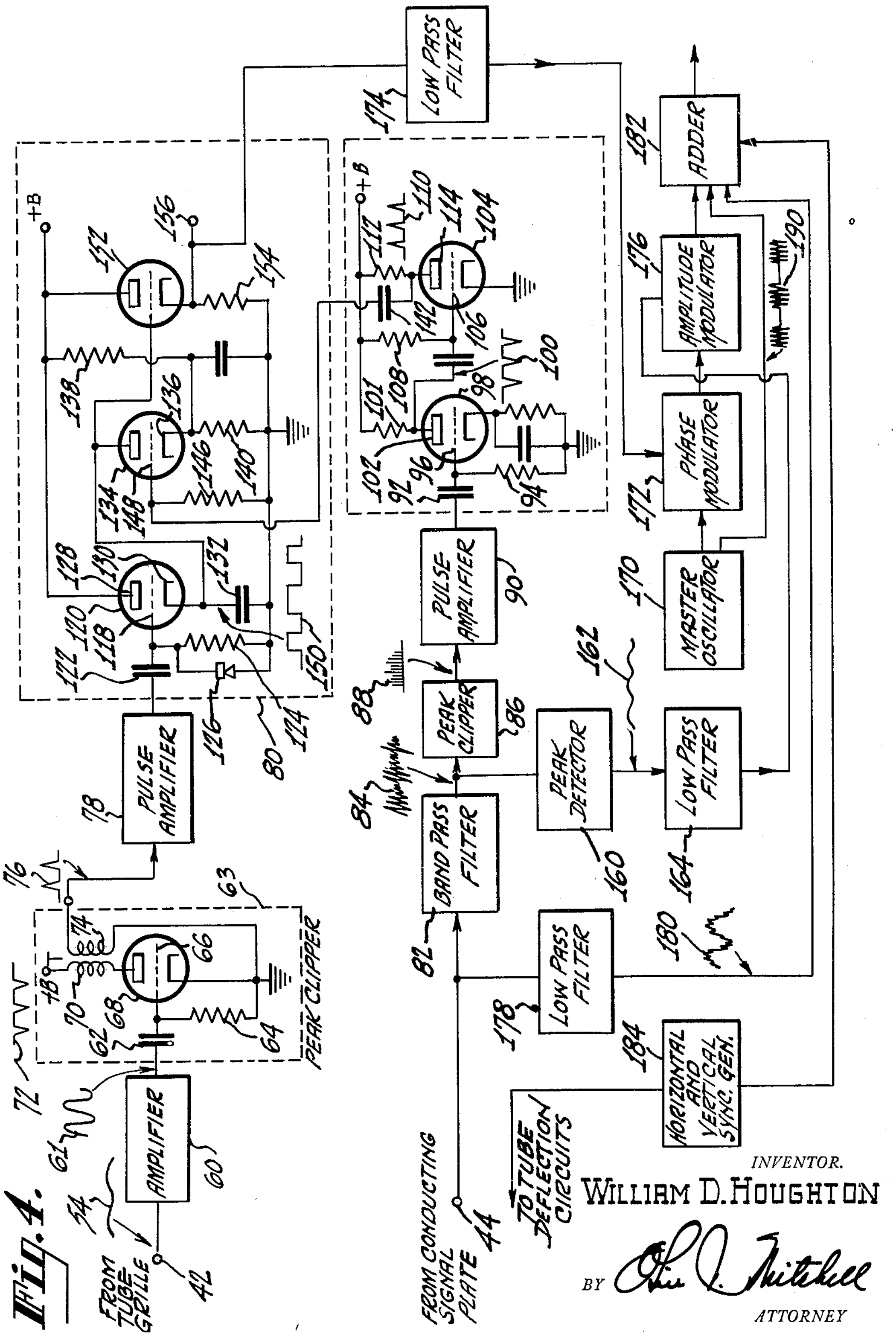
Fig. 4 is a combination block and schematic diagram of one embodiment of the present invention.

Fig. 4 illustrates a circuit in accordance with the present invention for employing the two outputs of the tube of Figs. 2 and 3 in developing a carrier wave which is phase-modulated as a function of the hue of an image and amplitude-modulated in accordance with its chromaticity.

The reference frequency 54 on lead 42 of the camera tube is amplified by suitable amplification means indicated by the block 60 and the resulting signal 61 is coupled by means of capacitor 62 and resistor 64 to the grid 66 of triode 68. The time constant of capacitor 62 and its associated resistor 64 should be made of such value as to produce little change in the grid leak voltage for the time interval between successive peaks of the sine wave produced by the amplifier 60, while being of small enough value to permit the grid bias of tube 68 to follow the amplitude variations of the applied sine wave. The amplitude of the sine wave applied to grid 66 is of such value that tube 68 draws grid current only during the positive peaks of the wave, the tube being cut off at all other times by reason of the grid leak bias provided by resistor 64. Thus, tube 68 will be conductive for only the short time of the positive peaks of the sine wave 61. It will be appreciated that, each time tube 68 draws grid current, a pulse of plate current 72 will flow through primary winding 70 of transformer "T." The secondary winding 74 of the transformer is of such polarity that a positive voltage pulse 76 is developed across its terminals. Pulses 76 are amplified by suitable circuitry contained in block 78 and are fed into the variable-width pulse generator contained within the dotted line rectangle 80, the operation of which will be explained in detail hereinafter in connection with its role in comparing the reference frequency wave 54 with the output of the conducting signal plate 26 of the camera tube 14.

The phase- and amplitude-modulated output of camera tube 14 which contains the brightness components of the image "seen" thereby is fed through a band pass filter 82 for selecting the color information indicated by waveform 84 and this voltage waveform is applied to a peak clipper 86 which may be of the type shown schematically in the rectangle 63. The output of peak clipper 86 contains a pulse at the positive peak at each cycle of the wave comprising the input to the clipper and is shown diagrammatically at 88. The positive pulses of waveform 88 are amplified by suitable means 90 and are coupled through capacitor 92 and resistor 94 to the grid 96 of a triode 98 which serves as a pulse limiter. Tube 98 amplifies the pulses to produce a negative pulse signal indicated by waveform 100 across load resistor 101 in circuit with its anode 102. By selecting suitable values for the circuit components, the amplitude of the pulses at plate 102 may be made sufficient in value to cause tube 104 to be driven negatively to a value considerably below cutoff so that each of the negative pulses 100 applied to grid 106 of tube 104 causes the cessation of plate current in that tube. During the time intervals between pulses 100 the grid voltage of tube 104 rises to a value of approximately zero, by reason of the fact that its grid leak resistor 108 is returned to a source of positive potential (not shown) so that a small grid current flow maintains the grid-to-cathode voltage at approximately zero. Hence, each of pulses 100 causes the grid 106 to be driven from zero to beyond cutoff, thus causing the production of positive pulses 110 across the load resistor 112 in the plate circuit 114 of tube 104. The positive pulses 110 of constant amplitude thus derived from the phase- and amplitude-modulated signal from the camera tube at terminal 44 are employed in comparing the phase of such output signal with the phase of the reference frequency signal 54 developed by the grille 32.

Comparison of the phase of pulses 110 with the phase of the reference pulses 76 is performed by the circuitry within the dotted line rectangle 80. More specifically, the positive-going pulses 76 from pulse amplifier 78 are coupled to grid 118 of tube 120 by means of a coupling network comprising capacitor 124 and crystal diode 126. As will be apparent to those persons skilled in the art, the diode 126 forms, in conjunction with capacitor 122 and resistor 124, a peak detector which furnishes to the grid 118 a negative D. C. voltage which is approximately equal to the peak amplitude of the pulses corresponding to 76. By selecting suitable values for the circuit constants, the amplitude of the applied pulses is such that this D. C. voltage will maintain tube 120 biased below cutoff between input pulses, so that the tube 120 will be conductive only during the positive peaks. During the conduction of tube 120, which includes a plate 128 and cathode 130, a charge is stored in cathode capacitor 132, which charge remains therein until a discharge path is provided. Such a path is afforded by the conduction of tube 134 which is normally biased below cutoff by means of a positive voltage applied to its cathode 136 through the voltage dividing network comprising resistors 138 and 140 connected between a source of positive voltage (not shown) and ground. The positive-going pulses 110 which appear across load resistor 112 are coupled by capacitor 142 and resistor 146 to the grid 148 of tube 134 so that that tube becomes conductive during each of the pulses 110. The conduction of tube 134 provides, as stated, a discharge path for capacitor 132. In view of the successive charging and discharging of capacitor 132 effected, respectively by the positive pulses applied to grid 118 and the pulses 110 which are applied to tube 134, a substantially rectangular waveform 150 is produced, the termination of each of the rectangular pulses thereof being controlled by the timing of the occurrence of pulses 110. It has already been noted that the phase of each of pulses 110 corresponds to the phase of each of the cycles of signal 84 which is selected by the band pass filter 82. Furthermore, the phase of pulses 76 is exactly controlled by the reference frequency 54 furnished by the wire grille within the camera tube 14. Hence, the width of the pulses 150 is exactly indicative of the phase difference between the two outputs of the camera tube. Waveform 150 is made to appear across the resistor 154 in the cathode circuit of the cathode follower 152 and is available at terminal 156 for use to be described.

The chromaticity or color saturation of the signal available at output terminal 44 of the camera tube is developed in the following manner: The selected waveform 84, referred to above as the output of band pass filter 82, is fed through a peak detector 160 which has as its function that of detecting the amplitude of the peaks comprising the waveform. The output of peak detector 160, indicated at 162, is fed through a low pass filter 164 which removes the undesired high frequency components so that the output of the low pass filter is a voltage which is a function of the chroma of the image.

A master oscillator 170, which may be of any suitable type known in the art, produces a carrier wave (not shown) which is fed into a phase modulator 172 of any known variety such as one employing a reactance tube device. Modulation of the phase of the output of the master oscillator may be effected by conventional circuitry indicated by block 172 by means of the variable width pulses 150, as follows: The variable width pulses available at terminal 156 are fed through a low pass filter 174 in order to remove the "width modulation" from the pulse signal, so that the output of the filter is a direct function of the phase shift of signal 84 with respect to the reference 54. Hence, as explained in connection with Figs. 1 and 1*a*, the output of low pass filter 174 is a function of the hue of the color image scanned by camera tube 14. The voltage produced by filter 174 is then fed directly to the reactance tube device contained within block 172 to shift the phase of the carrier wave in accordance with hue.

The output of peak detector 160 and low pass filter 164, which is a function of chroma (as hereinbefore explained), is fed through block 176 which may contain any known suitable amplitude-modulating means, for the purpose of modulating the amplitude of the previously phase-modulated carrier wave in accordance with chroma.

The composite phase- and amplitude-modulated output of camera tube 14 taken from terminal 44 thereof is also fed through a low pass filter 178 which has as its function that of rejecting all except the low frequency brightness information. The brightness signal thus obtained is indicated at 180 and is applied to adder circuit 182 where it is combined with the phase- and amplitude-modulated carrier wave resulting from the phase- and amplitude-modulation effected by blocks 172 and 176.

The horizontal and vertical synchronizing signals required for operation of known television systems are generated by suitable means indicated diagrammatically at 184 and are applied both to the deflection circuits camera tube 14 and, as shown, to adder 182 for combination with the composite carrier signal.

Suitable means (not shown) for producing synchronizing frequency "bursts" adapted to be transmitted along with the color carrier are provided, and such bursts, illustrated at 190, are also fed into adder 182.

In the operation of the system as thus far described, the reference frequency produced by the wire grille 32 is amplified and employed to produce peaks 76 indicative of a reference phase, while the phase- and amplitude-modulated output of tube 14 is filtered at 82 to produce the selected waveform 84 which is also peak clipped and amplified to produce pulses 110 indicative of the phase of the color carrier. Pulses 110 and 76 are applied to the variable-width pulse generator 80 which furnishes at terminal 156 a rectangular waveform whose width is indicative of the phase variation between the reference pulses 76 and the carrier waveform 84. The variable-width pulses are coupled to low pass filter 174 which removes the "width modulation" to produce a voltage indicative of phase-shift or "hue." Simultaneously therewith, the selected waveform 84 is peak-detected at 160 and fed through low pass filter 164 to produce a voltage whose amplitude is employed at 176 to amplitude-modulate the carrier wave of the master oscillator.

The brightness components of the output of camera tube 14 are selected from the tube's composite output by low pass filter 178 and are combined with the phase and amplitude modulated color carrier by means of adder 182, together with synchronizing bursts 190 and horizontal and vertical sync pulses furnished by generators 184. Thus, it has been seen that the circuitry of Fig. 4, in conjunction with the tube of Figs. 2 and 3, furnishes a phase- and amplitude-modulated color carrier wave containing black and white information which may be used in systems contemplated by the NTSC article cited above, which signal is "compatible" with present-day black and white television standards.

Figure 5:
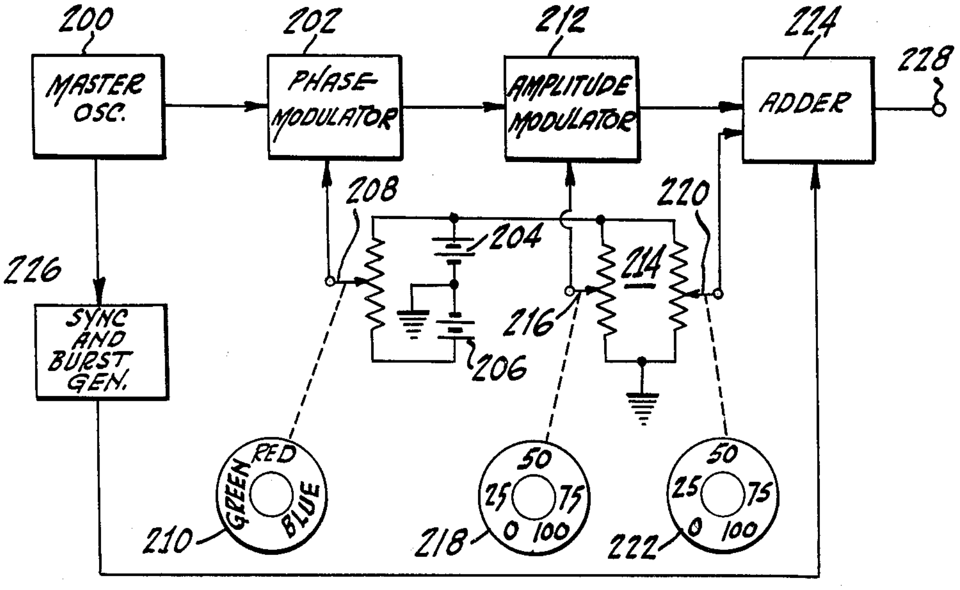
Fig. 5 illustrates a test signal generator according to the invention.

Fig. 5 illustrates, by way of a block diagram, apparatus according to the theory of the present invention for producing a test signal adapted for use in checking the response of video equipment of the type designed to handle a color signal comprising a phase-modulated and amplitude-modulated color carrier such as is described in the above-mentioned article. As shown in the drawing, there is provided a master oscillator 200 of any known type which produces a carrier wave of suitable frequency. A phase-modulator, which may be of the type employing a reactance tube device, is indicated at 202 and is supplied with a voltage from the circuit including batteries 204 and 206 and potentiometer 208. A manual dial control 210 is mechanically linked to the variable tap 208 and is adapted to control the voltage applied to the phase modulator in accordance with a given hue, as indicated on the dial by suitable indicia such as "red," "green" and "blue." The carrier wave from oscillator 200, after having been phase-shifted at 202 by means of the voltage fed thereto as thus described, is amplitude-modulated by suitable means at 212 by the voltage supplied from network 214 which includes a variable tap 216 coupled mechanically to a "chroma percentage" dial 218. The brightness or black and white signal of the desired type is provided by variable tap 220, which is controlled by means of a manual dial 222, and is combined with the phase- and amplitude-modulated carrier wave in adder 224. A sync and "burst" generator 226 of any known suitable type furnishes horizontal and vertical synchronizing pulses together with synchronizing frequency "bursts" and these signals are also combined with the phase- and amplitude-modulated carrier in adder 224. Thus, the output signal appearing at terminal 228 comprises horizontal and vertical synchronizing pulses, synchronizing frequency "bursts" and a color carrier wave, the phase of which is indicative of hue, while its amplitude is indicative of color saturation. The black and white or brightness component which is fed into the adder 224 from voltage dividing network 214 is also present for setting the brightness level of the test signal.

As persons skilled in the art will understand, the present invention involves a system for developing a phase- and amplitude-modulated color carrier from a single-color pickup tube which furnishes an output signal which is phase- and amplitude-modulated, together with a reference signal by means of which the phase variations of the color output may be determined. It should be readily apparent that the present invention, which eliminates the need for a plurality of color pickup devices, is not limited in its scope to use with the specific pickup tube employed by way of illustration, since it is the basic concept of the invention to provide means for phase-modulating a carrier to indicate hue and to amplitude-modulate the same carrier as a representation of chroma.

Having thus described my invention, what I claim as new and desire to secure by Letters Patent is:

1. A color television system which comprises: a color pickup tube adapted to generate a reference voltage wave of fixed phase and a color signal whose phase with respect to said reference phase is indicative of the hue of an object and whose amplitude is indicative of the saturation of such hue; means operatively associated with said pickup tube for deriving from said color signal a voltage whose magnitude is a function of the phase difference between said color signal and said reference voltage; means for detecting the amplitude of said color signal; a source of carrier wave; and means coupled to said source for varying the phase of a carrier wave from said source in accordance with said derived voltage; and means for modulating the amplitude of said carrier wave in accordance with the magnitude of the output of said detecting means.

2. A system as defined by claim 1 wherein said color signal includes a D. C. level indicative of brightness; means for separating said color signal from said D. C. level; and means for superimposing said phase- and amplitude-modulated carrier wave on said D. C. level.

3. A system as defined by claim 1 wherein said voltage-deriving means comprises a pulse generator; means for applying to said pulse generator voltage pulses corresponding to said reference voltage wave; means for coupling to said pulse generator pulses corresponding to the phase of said color signal, whereby said pulse generator is adapted to produce an output voltage indicative of the time difference between said pulses corresponding to said reference and said pulse corresponding to said color signal.

4. A system as defined by claim 1 wherein said voltage-deriving means comprises a pulse generator; means for applying to said pulse generator voltage pulses corresponding to said reference voltage wave; means for coupling to said pulse generator pulses corresponding to the phase of said color signal, whereby said pulse generator is adapted to generate pulses whose duration is substantially equal to the phase difference between said reference voltage and said color signal.

5. A system adapted to transmit color information which comprises: an oscillator for producing a carrier wave of substantially constant phase and amplitude; phase-shifting means operatively coupled to said oscillator for shifting the phase of such carrier wave; amplitude-modulating means; means for developing a voltage wave, the magnitude of which is variable in accordance with hue; means for applying said voltage to said phase-shifting means in such manner as to vary the phase of said carrier wave in accordance with such voltage; means for developing a voltage, the magnitude of which varies as a function of chroma; and coupling means for applying said carrier wave and said second-named voltage to said amplitude-modulating means in such manner as to vary the amplitude of said carrier wave in accordance with said second-named voltage.

6. A system as set forth in claim 5 including means for varying said first-named voltage and means for varying said second-named voltage.

7. A test signal generator which comprises: an oscillator for producing a carrier wave of substantially constant phase and amplitude; phase modulating means; a variable voltage source; and means coupling said carrier wave oscillator and said voltage source to said phase-modulating means to cause said phase modulating means to vary the phase of said carrier wave in accordance with the magnitude and polarity of voltage from said source.

8. A signal generator as defined by claim 7 including means for varying the amplitude of said carrier wave and means for applying said carrier wave to said amplitude-varying means.

9. A system which comprises: image pickup means for generating a signal voltage, said voltage being phase-modulated with respect to a reference phase such that the vectorial position of said voltage is determined by the hue of an object in the field of said pickup device, the amplitude of said voltage being proportional to the saturation of such hue; means for generating a reference voltage wave of substantially fixed phase; a capacitor; means operatively coupled to said capacitor and responsive to said reference voltage for charging said capacitor and means responsive to said signal voltage for discharging said capacitor in such manner as to develop pulse whose width is proportional to the phase difference between said reference wave and said phase-modulated signal.

10. A system as defined by claim 9 including means for generating a carrier of substantially fixed phase and amplitude; phase-shifting means, and means coupling said carrier and a voltage proportional to said pulses to said phase-shifting means, whereby to modulate the phase of said carrier in accordance with the hue of such object.

11. A system as defined by claim 10 including means for detecting the amplitude of said signal voltage and means for modulating said carrier with a voltage proportional to said detected amplitude.

References Cited in the file of this patent

UNITED STATES PATENTS

| | | |
|---|---|---|
| 2,333,969 | Alexanderson | Nov. 9, 1943 |
| 2,492,926 | Valensi | Dec. 27, 1949 |
| 2,558,489 | Kalfaian | June 26, 1951 |
| 2,580,903 | Evans | Jan. 1, 1952 |
| 2,606,246 | Sziklai | Aug. 5, 1952 |
| 2,618,700 | Weimer | Nov. 18, 1952 |
| 2,627,549 | Kell | Feb. 3, 1953 |